United States Patent
Lohmann

(10) Patent No.: US 7,343,908 B2
(45) Date of Patent: Mar. 18, 2008

(54) EGR SYSTEM HAVING EGR VALVE WITH PURGE AIR CHAMBER

(75) Inventor: Craig William Lohmann, Denver, IA (US)

(73) Assignee: Deere & Company, Moline, IL (US)

( * ) Notice: Subject to any disclaimer, the term of this patent is extended or adjusted under 35 U.S.C. 154(b) by 29 days.

(21) Appl. No.: 11/315,566

(22) Filed: Dec. 22, 2005

(65) Prior Publication Data

US 2007/0144503 A1    Jun. 28, 2007

(51) Int. Cl.
*F02M 25/07*   (2006.01)
*F02B 47/08*   (2006.01)
*F02B 33/44*   (2006.01)

(52) U.S. Cl. ............................. 123/568.15; 123/568.2; 123/568.21

(58) Field of Classification Search ........... 123/568.11, 123/568.15, 568.2, 559.1, 568.21; 60/605.2
See application file for complete search history.

(56) References Cited

U.S. PATENT DOCUMENTS

| | | | | |
|---|---|---|---|---|
| 4,278,063 | A * | 7/1981 | Nakamura et al. | 123/432 |
| 4,313,415 | A * | 2/1982 | Shinzawa | 123/568.15 |
| 5,974,802 | A * | 11/1999 | Blake | 60/605.2 |
| 6,484,703 | B1 * | 11/2002 | Bailey | 123/568.15 |

FOREIGN PATENT DOCUMENTS

JP    07279776 A  * 10/1995   ............ 123/568.15

* cited by examiner

*Primary Examiner*—Willis R. Wolfe, Jr.

(57) ABSTRACT

An exhaust gas recirculation system for an internal combustion engine includes an intake manifold, an exhaust manifold, and a turbocharger compressor coupled with the intake manifold. The exhaust gas recirculation system includes an EGR valve fluidly coupled between the exhaust manifold and the intake manifold. The EGR valve includes a valve stem and a purge air inlet associated with the valve stem. The purge air inlet is in fluid communication with the compressor.

14 Claims, 3 Drawing Sheets

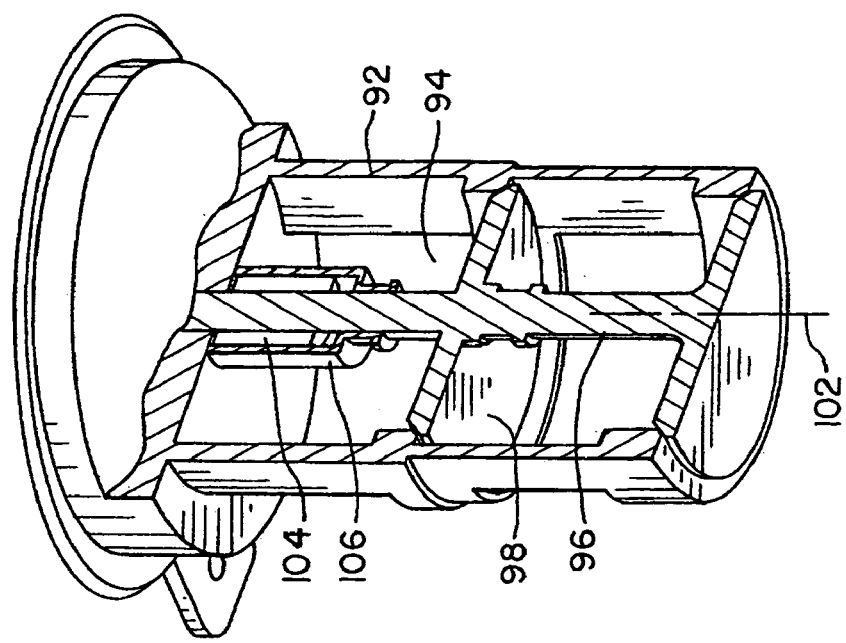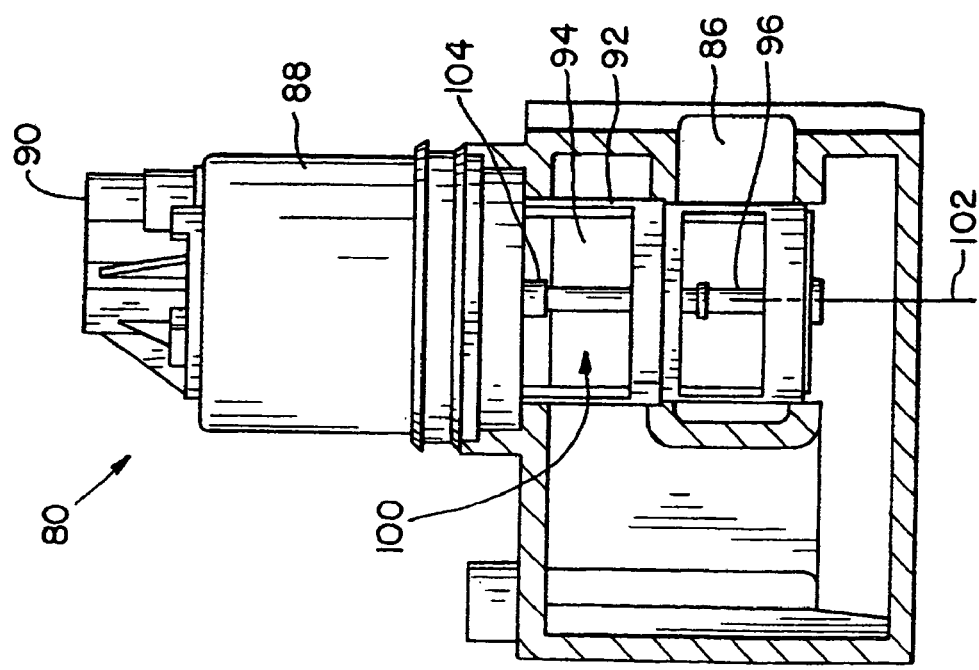

EGR SYSTEM HAVING EGR VALVE WITH PURGE AIR CHAMBER

FIELD OF THE INVENTION

The present invention relates to internal combustion engines, and, more particularly, to exhaust gas recirculation systems in such engines.

BACKGROUND OF THE INVENTION

An internal combustion (IC) engine may include an exhaust gas recirculation (EGR) system for controlling the generation of undesirable pollutant gases and particulate matter in the operation of IC engines. EGR systems primarily recirculate the exhaust gas by-products into the intake air supply of the IC engine. The exhaust gas which is reintroduced to the engine cylinder reduces the concentration of oxygen therein, which in turn lowers the maximum combustion temperature within the cylinder and slows the chemical reaction of the combustion process, decreasing the formation of nitrous oxides (NOx). Furthermore, the exhaust gases typically contain unburned hydrocarbons which are burned on reintroduction into the engine cylinder, which further reduces the emission of exhaust gas by-products which would be emitted as undesirable pollutants from the IC engine.

An IC engine may also include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the fluid to the combustion chambers. The fluid which is compressed by the compressor may be in the form of combustion air or a fuel and air mixture.

When utilizing EGR in a turbocharged diesel engine, the exhaust gas to be recirculated is preferably removed upstream of the exhaust gas driven turbine associated with the turbocharger. In many EGR applications, the exhaust gas is diverted by a poppet-type EGR valve directly from the exhaust manifold. The percentage of the total exhaust flow which is diverted for introduction into the intake manifold of an internal combustion engine is known as the EGR rate of the engine.

With an EGR system using an EGR valve as described above, typically a solenoid operated valve stem carries a valve disk and is reciprocated within a bushing. The exhaust gas flowing through the EGR valve deposits particulates on the valve stem which can interfere with the operation of the EGR valve and cause premature failure of the EGR valve.

What is needed in the art is an EGR system having an EGR valve which remains operative after prolonged exposure to EGR gas flowing through the valve.

SUMMARY OF THE INVENTION

The present invention provides an EGR valve which receives combustion air around a valve stem at a pressure higher than the EGR gas.

The invention comprises, in one form thereof, an EGR valve for use in an exhaust gas recirculation system of an internal combustion engine. The EGR valve includes a valve body; a valve stem carried by the valve body; a valve disk attached to the valve stem; a purge air chamber at least partially surrounding the valve stem; a purge air inlet in communication with the purge air chamber for receiving combustion air; and an EGR inlet for receiving exhaust gas.

The invention comprises, in another form thereof, an exhaust gas recirculation system for an internal combustion engine including an intake manifold, an exhaust manifold, and a turbocharger compressor coupled with the intake manifold. The exhaust gas recirculation system includes an EGR valve fluidly coupled between the exhaust manifold and the intake manifold. The EGR valve includes a valve stem and a purge air inlet associated with the valve stem. The purge air inlet is in fluid communication with the compressor.

BRIEF DESCRIPTION OF THE DRAWINGS

FIG. 4 is a sectional view taken along line 44 in FIG. 3; and

FIG. 5 is a fragmentary, perspective view of the EGR valve shown in FIGS. 3 and 4.

DETAILED DESCRIPTION OF THE INVENTION

Figure 1:
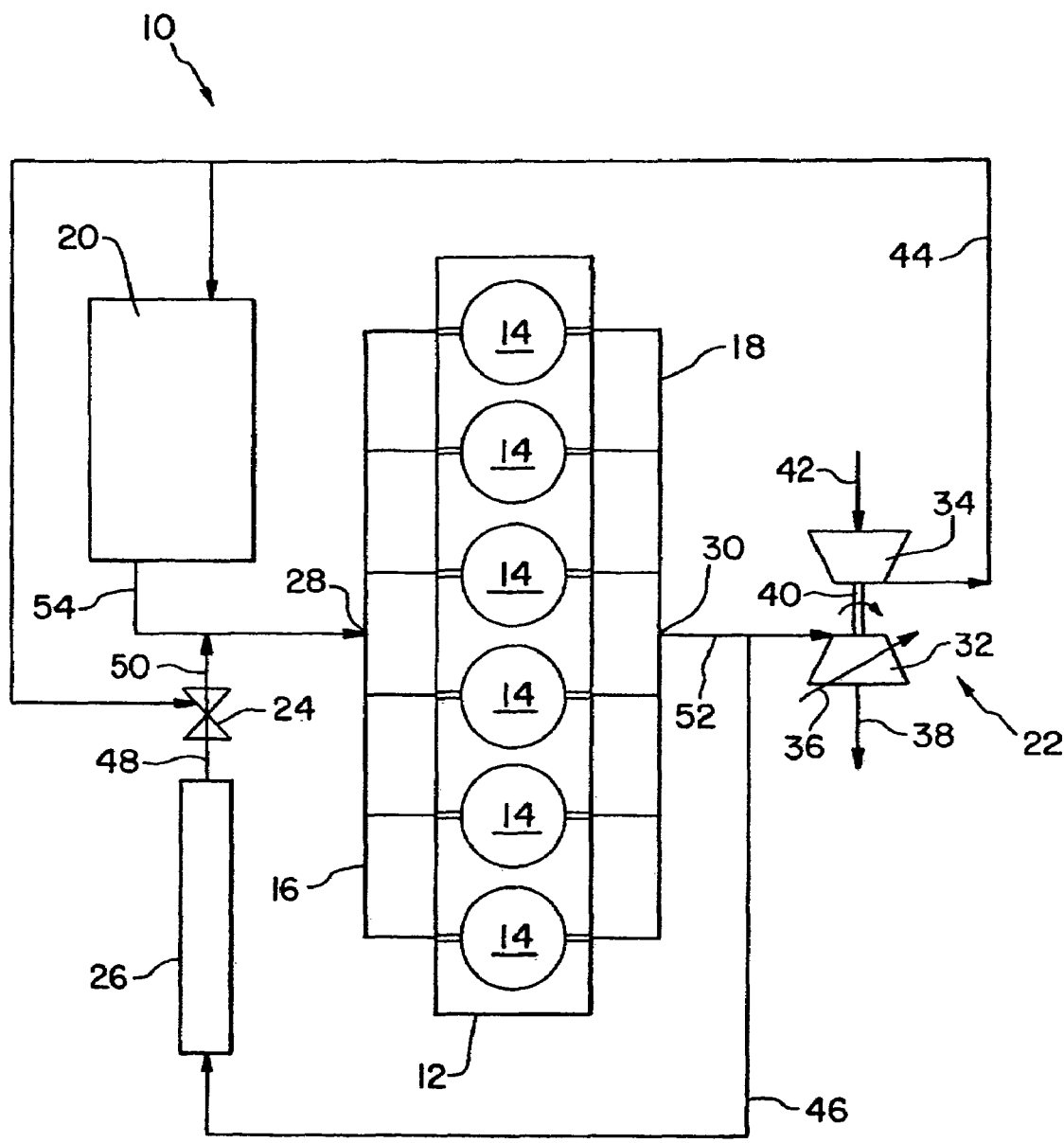
FIG. 1 is a schematic illustration of an embodiment of an internal combustion engine of the present invention.

Referring now to the drawings, and more particularly to FIG. 1, there is shown an embodiment of an IC engine 10 of the present invention, which generally includes a block 12 having a plurality of combustion cylinders 14, intake manifold 16, exhaust manifold 18, charge air cooler 20, turbocharger 22, EGR valve 24 and EGR cooler 26. In the embodiment shown, IC engine 10 is a diesel engine which is incorporated into a work machine, such as an agricultural tractor or combine, but may be differently configured, depending upon the application.

Block 12 is typically a cast metal block which is formed to define combustion cylinders 14. In the embodiment shown, block 12 includes six combustion cylinders 14, but may include a different number depending upon the application. Intake manifold 16 and exhaust manifold 18 are also typically formed from cast metal, and are coupled with block 12 in conventional manner, such as by using bolts and gaskets. Intake manifold 16 and exhaust manifold 18 are each in fluid communication with combustion cylinders 14. Intake manifold 16 receives charge air from charge air cooler 20 at intake manifold inlet 28, and supplies charge air (which may be air or a fuel/air mixture) to combustion cylinders 14, such as by using fuel injectors (not shown).

Similarly, exhaust manifold 18 is in fluid communication with combustion cylinders 14, and includes an outlet 30 from which exhaust gas from combustion cylinders 14 is discharged to turbocharger 22.

Turbocharger 22 includes a variable geometry turbine (VGT) 32 and a compressor 34. VGT 32 is adjustably controllable as indicated by line 36, and includes an actuatable element which is controlled electronically using a controller (not shown). For example, VGT 32 may be actuated by changing the position of turbine blades, a variable size orifice, or other actuatable elements. The turbine within VGT 32 is driven by exhaust gas from exhaust manifold 18, and is exhausted to the environment, as indicated by arrow 38.

VGT 32 mechanically drives compressor 34 through a rotatable shaft 40. Compressor 34 is a fixed geometry compressor in the embodiment shown. Compressor 34 receives combustion air from the ambient environment as indicated by line 42, and discharges the compressed combustion air via line 44 to charge air cooler 20. As a result of the mechanical work through the compression of the combustion air, the heated charge air is cooled in charge air cooler 20 prior to being introduced at inlet 28 of intake manifold 16.

EGR valve 24 and EGR cooler 26 are part of an EGR system which also includes a first fluid line 46, second fluid line 48 and third fluid line 50. The term fluid line, as used herein, is intended broadly to cover a conduit for transporting a gas such as exhaust gas and/or combustion air, as will be understood hereinafter.

First fluid line 46 is coupled at one end thereof with a fluid line 52 interconnecting exhaust manifold outlet 30 with VGT 32. First fluid line 46 is coupled at an opposite end thereof with EGR cooler 26. Second fluid line 48 fluidly interconnects EGR cooler 26 with EGR valve 24. Third fluid line 50 fluidly interconnects EGR valve 24 with fluid line 54 extending between charge air cooler 20 and inlet 28 of intake manifold 16.

Figure 2:
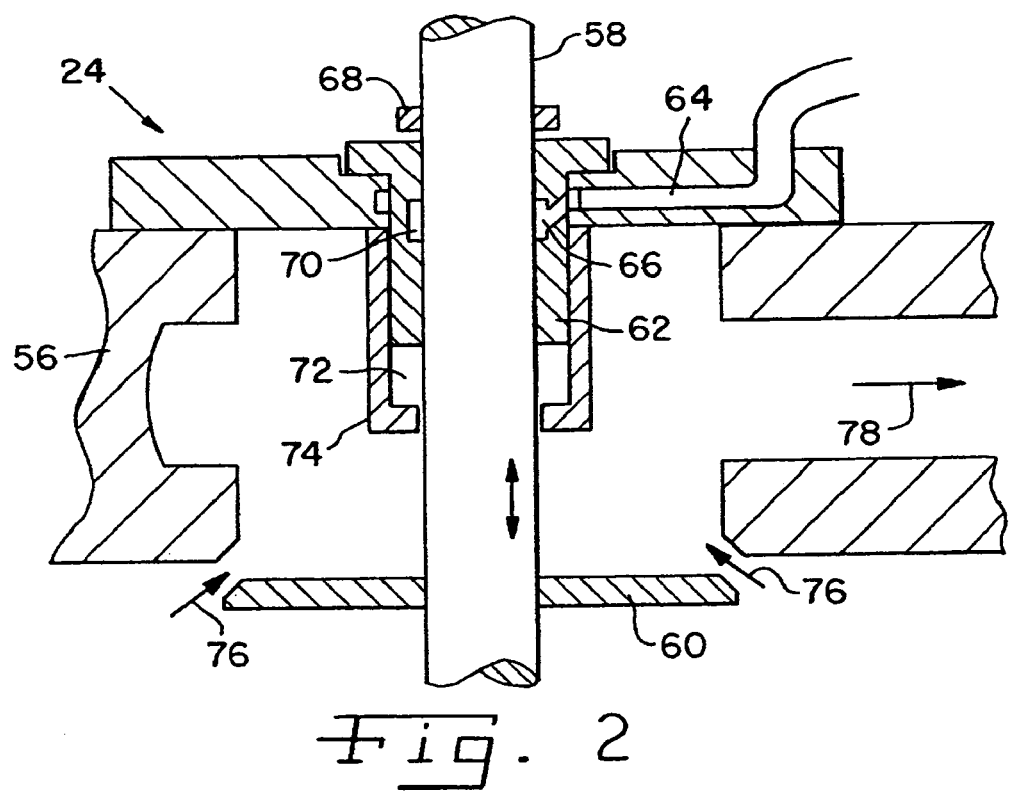
FIG. 2 is a fragmentary, sectional view of an embodiment of an EGR valve of the present invention.

Referring now to FIG. 2, EGR valve 24 will be described in greater detail. EGR valve 24 generally includes a valve body 56, valve stem 58 carried by valve body 56, and valve disk 60 coupled to an end of valve stem 58. Valve stem 58 is reciprocally movable within a bushing 62, and is selectively moved by actuating a solenoid coil (not shown in FIG. 2).

Valve body 56 includes a purge air port 64 terminating at a purge air inlet 66. Purge air port 64 is coupled with compressed combustion air via fluid line 44 at the upstream side of aftercooler 20, as shown in FIG. 1. A seal 68 positioned at the atmospheric side of bushing 62 prevents a flow of compressed air provided by purge air port 64 along valve stem 58 toward the ambient environment. Rather, the compressed combustion air flows around valve stem 58 in an annular purge air chamber 70 defined by bushing 62 at the periphery of valve stem 58. The compressed combustion air then flows through the annular clearance space between valve stem 58 and bushing 62 in a direction away from seal 68, into another purge air chamber 72 defined between valve stem 58 and a shield 74. The compressed combustion air then exits through the clearance space between the outer periphery of valve stem 58 and the distal end of shield 74. At the same time, when valve disk 60 is in an open position as shown in FIG. 2, EGR gas flows into valve body 56 as indicated by lines 76, and flows out from valve body 56 as indicated by line 78 to be mixed with the compressed combustion air entering intake manifold 16. The higher pressure combustion air flowing between shield 74 and valve stem 58 purges the area around valve stem 58 to inhibit the accumulation of particulate matter present in the EGR gas from becoming deposited on valve stem 58.

Figure 3:
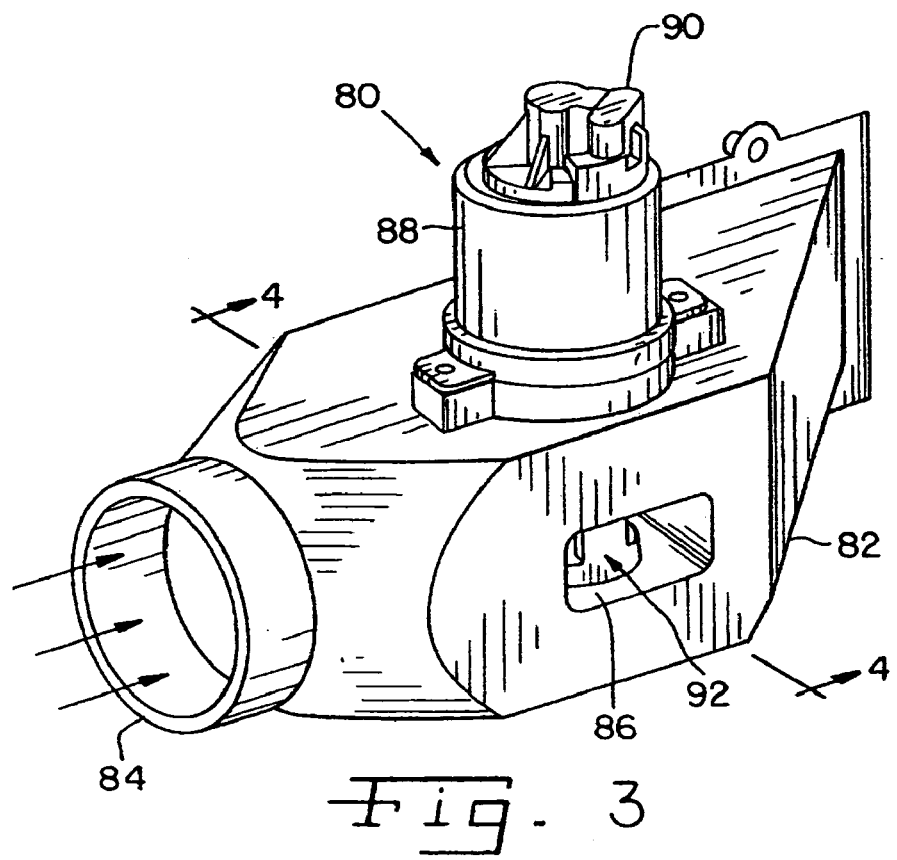
FIG. 3 is a perspective view of another embodiment of an EGR valve of the present invention.

Referring now to FIGS. 3-5, conjunctively, there is shown another embodiment of an EGR valve 80 of the present invention mounted to a fluid line 82. Fluid line 82 includes a combustion air inlet 84 coupled with the downstream side of aftercooler 20, and an EGR inlet 86 coupled with the downstream side of EGR cooler 26.

EGR valve 80 includes a cylindrical shaped solenoid 88 which is electrically coupled at an electrical connector port 90 to a controller (not shown). EGR valve 80 includes a valve body 92 having an open frame construction defining a purge air chamber 94 surrounding valve stem 96. A valve disk 98 carried by valve stem 96 and shown in the closed position in FIGS. 4 and 5 is movable to an open position allowing EGR gas to flow into purge air chamber 94 around valve stem 96. At the same time, compressed combustion air flows through purge air chamber 94 at a purge air inlet 100 on the upstream side thereof, in a direction generally perpendicular to a longitudinal axis 102 of valve stem 96. The flow of compressed combustion air through purge air inlet 100 and purge air chamber 94 purges or sweeps the flow of EGR gas also entering purge air chamber 94, thus inhibiting the EGR gas from flowing along the longitudinal direction of valve stem 96 toward bushing 104. To further assist in the prevention of accumulation of particulate matter from the EGR gas on valve stem 92, a shield 104 protects the area surrounding valve stem 96 adjacent bushing 104. Shield 106 may be coupled with bushing 104 and slide along valve stem 96, or may be coupled with valve stem 96 and slide along bushing 104.

During operation, IC engine 10 is operated to recirculate a selective amount of exhaust gas from exhaust manifold 18 to intake manifold 16 using an EGR system defined by first fluid line 46, EGR cooler 26, second fluid line 48, EGR valve 24 and third fluid line 50. EGR cooler 26 may also be positioned on the downstream side of EGR valve 24. A controller selectively actuates EGR valve 24 to provide EGR flow of the exhaust gas in the EGR flow direction indicated by the large directional arrows on first fluid line 46 and third fluid line 50. Higher pressure combustion air purges the area surrounding valve stem 58, 96 to prevent the accumulation of EGR gas particulate matter, as described above with reference to EGR valves 24 and 80.

In the embodiment shown in FIG. 1, first fluid line 46 is fluidly coupled with fluid line 52 extending between exhaust manifold 18 and VGT 32. However, it will also be understood that first fluid line 46 may be fluidly coupled directly with exhaust manifold 18 for certain applications. Similarly, third fluid line 50 is fluidly coupled with fluid line 54 interconnecting charge air cooler 20 and inlet 28 of intake air manifold 16. However, it will also be understood that third fluid line 50 may be coupled directly with intake air manifold 16 in certain applications.

Moreover, in the embodiment shown, turbocharger 22 includes a VGT 32. However, turbocharger 22 may also include a fixed geometry turbine, depending upon the application.

Having described the preferred embodiment, it will become apparent that various modifications can be made without departing from the scope of the invention as defined in the accompanying claims.

The invention claimed is:

1. An internal combustion engine, comprising:
    a block defining at least one combustion cylinder;
    an intake manifold fluidly coupled with at least one said combustion cylinder;
    an exhaust manifold fluidly coupled with at least one said combustion cylinder;
    a turbocharger including a turbine fluidly coupled with said exhaust manifold, and a compressor fluidly coupled with said intake manifold;
    an EGR valve fluidly coupled between said exhaust manifold and said intake manifold, said EGR valve including a valve stem, a shield surrounding said valve stem, a purge air inlet associated with said valve stem, said purge air inlet being in fluid communication with said compressor, and a purge air chamber defined by said shield, said purge air chamber in communication with said purge air inlet.

2. The internal combustion engine of claim 1, wherein said EGR valve includes a purge air port terminating at said purge air inlet.

3. The internal combustion engine of claim 1, wherein said EGR valve is fluidly interconnected between an EGR cooler and said intake manifold.

4. The internal combustion engine of claim 1, including an aftercooler interconnected between said compressor and said intake manifold, said purge air inlet being in fluid communication with said compressor upstream from said aftercooler.

5. The internal combustion engine of claim 1, wherein said EGR valve includes an open frame defining each of said purge air inlet and said purge air chamber.

6. The internal combustion engine of claim 5, wherein said valve stem has a longitudinal axis, and said purge air inlet and said purge air chamber define a cross flow direction transverse to said longitudinal axis.

7. An exhaust gas recirculation system for an internal combustion engine, the internal combustion engine including an intake manifold, an exhaust manifold, and a turbocharger compressor coupled with the intake manifold, said exhaust gas recirculation system comprising: an EGR valve fluidly coupled between said exhaust manifold and said intake manifold, said EGR valve including a valve stem, a shield surrounding said valve stem, a purge air inlet associated with said valve stem, said purge air inlet being in fluid communication with said compressor, and a purge air chamber defined by said shield, said purge air chamber in communication with said purge air inlet.

8. The exhaust gas recirculation system of claim 7, wherein said EGR valve includes a purge air port terminating at said purge air inlet.

9. The exhaust gas recirculation system of claim 7, wherein said EGR valve includes an open frame defining each of said purge air inlet and said purge air chamber.

10. The exhaust gas recirculation system of claim 9, wherein said valve stem has a longitudinal axis, and said purge air inlet and said purge air chamber define a cross flow direction transverse to said longitudinal axis.

11. An EGR valve for use in an exhaust gas recirculation system of an internal combustion engine, said EGR valve comprising:

a valve body;

a valve stem carried by said valve body;

a shield surrounding said valve stem;

a valve disk attached to said valve stem;

a purge air chamber defined by said shield;

a purge air inlet in communication with said purge air chamber for receiving combustion air; and an EGR inlet for receiving exhaust gas.

12. The EGR valve of claim 11, wherein said EGR valve includes a purge air port terminating at said purge air inlet.

13. The EGR valve of claim 11, wherein said valve body includes an open frame defining each of said purge air inlet and said purge air chamber.

14. The EGR valve of claim 13, wherein said valve stem has a longitudinal axis, and said purge air inlet and said purge air chamber define a cross flow direction transverse to said longitudinal axis.

* * * * *